I. F. BAKER.
AUTOMOBILE CONTROL.
APPLICATION FILED JUNE 7, 1909.

1,045,496.

Patented Nov. 26, 1912.

2 SHEETS—SHEET 2.

WITNESSES:
J. Earl Ryan
J. Ellis Elen.

INVENTOR:
ISAAC F. BAKER,
BY Albert G. Davis
ATT'Y.

UNITED STATES PATENT OFFICE.

ISAAC F. BAKER, OF EAST ORANGE, NEW JERSEY, ASSIGNOR, BY MESNE ASSIGNMENTS, TO GENERAL ELECTRIC COMPANY, A CORPORATION OF NEW YORK.

AUTOMOBILE CONTROL.

1,045,496.  Specification of Letters Patent.  Patented Nov. 26, 1912.

Application filed June 7, 1909. Serial No. 500,684.

*To all whom it may concern:*

Be it known that I, ISAAC F. BAKER, a citizen of the United States, residing at East Orange, county of Essex, State of New Jersey, have invented certain new and useful Improvements in Automobile Controls, of which the following is a specification.

My invention relates to the control of self-propelled vehicles or automobiles of the type in which a plurality of electric motors are employed and connected to different driving wheels, and in which current for the motors is furnished by a generator driven by a prime mover, such as a gasolene engine on the vehicle. In such automobiles it has heretofore been the usual practice to have the motors connected permanently in parallel, because if they are in series and one driving wheel happens to be on a slippery part of the road that wheel will spin around and the motor driving it will take all the voltage, while the other driving wheel stands still and the vehicle will not start. A convenient method of controlling the motors consists in varying the generator voltage, but with the motors connected permanently in parallel the conditions of operation are severe for the generator, on account of the fact that when the largest current is drawn from the generator, as in starting, the field is weakest, which makes commutation very difficult.

The object of my invention is to obviate this difficulty.

My invention consists in providing means for deriving from the generator a neutral point with respect to the terminal voltage of the generator and connecting the motors in series to the generator terminals but with the middle point of the motor circuit connected to the neutral point of the generator. By means of this arrangement equal voltages are maintained on both motors, so that the slipping of one wheel is avoided, while at the same time since the motors are in series at starting the armature current of the generator is less and the field stronger than with the usual control.

My invention will best be understood by reference to the accompanying drawings, in which—

Figure 1:
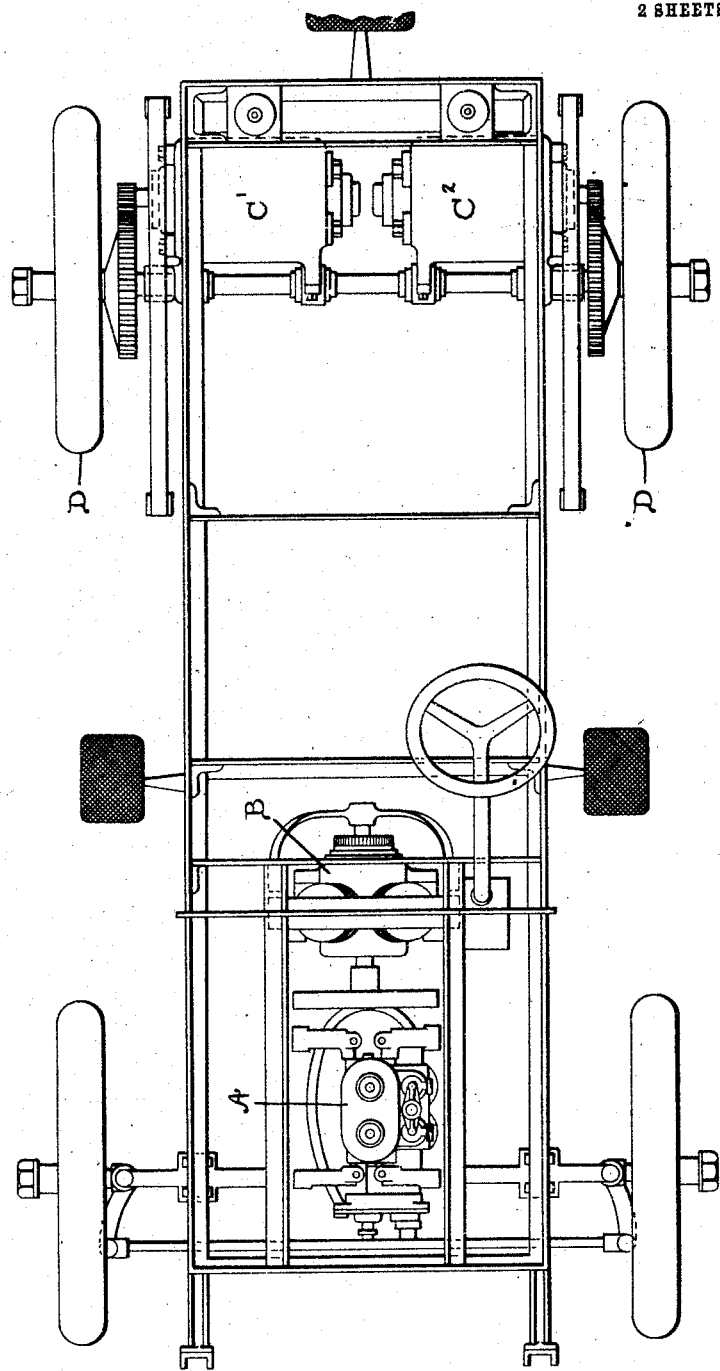
Figure 2:
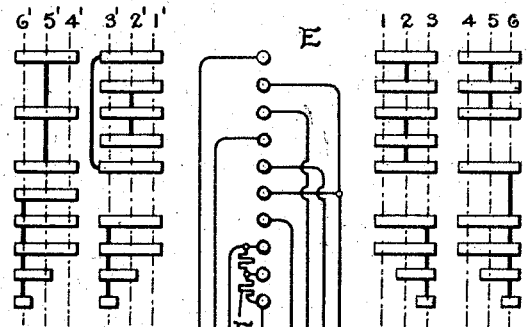
Figure 3:
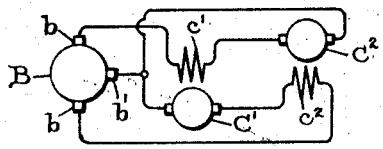
Figure 4:
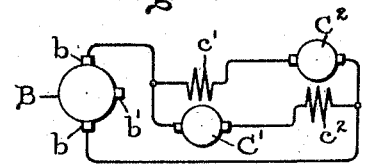
Figure 5:
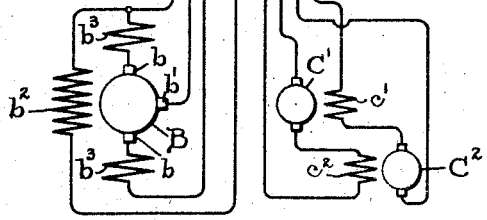

Figure 1 shows a plan view of the frame of an automobile, of the type to which my invention applies; Fig. 2 shows diagrammatically the circuits of generator, motors, and controlling switch; Figs. 3 and 4 show connections established in certain positions of the controlling switch of Fig. 2; and Fig. 5 shows a modification.

In the drawings, A represents a prime mover such as a gasolene engine driving an electric generator B.

$C'$ $C^2$ represent electric motors supplied with current from the generator B and connected to different driving wheels D D.

As shown in Fig. 2, the generator B in addition to the main brushes $b$, $b$ has an auxiliary brush $b'$ placed intermediate the main brushes and, consequently, at a potential neutral with respect to that of the main brushes. The generator is provided with a shunt winding $b^2$ and may be provided with a series winding $b^3$. $C'$ represents the armature and $c'$ the field of one motor, and $C^2$ the armature and $c^2$ the field of the other motor. E represents the controlling switch, which has six positions, indicated by dotted lines 1 to 6, for forward movement, and six positions, indicated by $1'$ to $6'$ for reverse. F represents a resistance adapted for connection in series with the shunt winding $b^2$ to vary the generator voltage.

When the controller E is moved into the first forward position, indicated by dotted line 1, the upper brush $b$ of the generator is connected through the upper series field $b^3$ to the motor field $c'$. The circuit continues through the motor armature $C^2$, motor armature $C'$, motor field $c^2$, lower series field $b^3$ to lower brush $b$. Both motors are thus connected in series across the generator terminals, while the middle point of the motor circuit, that is, the point of connection between the two motor armatures, is also connected to generator brush $b'$. These connections as just traced are shown in Fig. 3. It will be seen that, while the two motors are in series, the voltages of the two motors are maintained equal by the connection to the neutral brush $b'$. It will further be noted that each armature has the field of the other motor connected directly in series with it, this connection serving to equalize the motor torques, as is well understood in the art.

In the first position of the switch E, above described, all of the resistance F is in series with the shunt winding $b^2$, so that the generator voltage is at its lowest value. As the switch E is moved to its second and third positions the resistance F is gradually cut out of circuit but the circuit connections otherwise are not changed. When the switch E is moved from its third to its fourth position the resistance F is again cut into circuit so as to weaken the generator-field, the connection to the neutral brush $b'$ is broken, and the two motors are connected in parallel across the generator terminals as shown in Fig. 4. In moving to the fifth and sixth positions, the switch E again gradually cuts out resistance F so as again to increase the generator voltage. In moving through its reverse positions the same connections are established except that the armature of one motor and the field of the other are reversed, with respect to the other half of the motor circuit, so that the torque of both motors is reversed.

Instead of an auxiliary brush placed on the commutator between the main brushes, other arrangements for deriving from the generator a neutral point with respect to the terminal voltage may be employed. For instance, in Fig. 5, I have diagrammatically illustrated one well-known arrangement for this purpose consisting of a choke coil or reactance G connected across diametrically opposite points on the armature winding with its central point connected to a collector ring $g$ on which bears a brush $b^4$ which takes the place of the commutator brush $b'$ of Fig. 3.

I do not desire to limit myself to the particular arrangement shown, but aim in the appended claims to cover all modifications which come within the scope of my invention.

What I claim as new and desire to secure by Letters Patent of the United States, is,

1. In a self-propelled vehicle, a pair of electric motors connected to different driving wheels of the vehicle, a prime mover, an electric generator driven thereby, means for deriving from said generator a neutral point with respect to the terminal voltage of the generator, means for connecting the motors in series across the terminals of said generator and connecting the middle point of the motor circuit to said neutral point, and means for varying the field strength of said generator.

2. In a self-propelled vehicle, a pair of electric motors connected to different driving wheels of the vehicle, a prime mover, an electric generator driven thereby, means for deriving from said generator a neutral point with respect to the terminal voltage of the generator, means for connecting the armature of one motor and the field of the other in series between one terminal of the generator and said neutral point and the armature of the second motor and the field of the first motor in series between said neutral point and the other terminal of the generator, and means for varying the field strength of said generator.

3. In a self-propelled vehicle, a pair of electric motors connected to different driving wheels of the vehicle, a prime mover, a variable voltage electric generator driven thereby, means for deriving from said generator a neutral point with respect to the terminal voltage of the generator, and a controlling switch having its contacts arranged to connect the motors in series across the generator terminals with the middle point of the motor circuit connected to said neutral point, and subsequently to open the connection to said neutral point, and connect the motors in parallel across the generator terminals.

4. In a self-propelled vehicle, a pair of electric motors connected to different driving wheels of the vehicle, a prime mover, an electric generator driven thereby, means for deriving from said generator a neutral point with respect to the terminal voltage of the generator, and a controlling switch having its contacts arranged in one position to connect the motors in series across the generator terminals with the middle point of the motor circuit connected to said neutral point, in a subsequent position to strengthen the generator field by cutting resistance out of the generator field circuit, in a still subsequent position to open the connection to said neutral point, weaken the generator field by cutting resistance into the generator field circuit, and connect the motors in parallel across the generator terminals, and in a still subsequent position again to strengthen the generator field by cutting resistance out of the generator field circuit.

5. In a self-propelled vehicle, a pair of electric motors connected to different driving wheels of the vehicle, a prime mover, an electric generator driven thereby, means for deriving from said generator a neutral point with respect to the terminal voltage of the generator, and a controlling switch having its contacts arranged in one position to connect the motors in series across the generator terminals with the middle point of the motor circuit connected to said neutral point, in a subsequent position to strengthen the generator field by cutting resistance out of the generator field circuit, in a still subequent position to open the connection to said neutral point, weaken the generator field by cutting resistance into the generator field circuit, and connect the motors in parallel across the generator terminals, and in a still subsequent position again to strengthen the generator field by cutting resistance out of the generator field circuit, each motor armature in each of said connections having the field of the other motor directly in series with it.

In witness whereof, I have hereunto set my hand this 29th day of May, 1909.

ISAAC F. BAKER.

Witnesses:
JOHN E. FRANZEN,
A. I. CONROY.

Copies of this patent may be obtained for five cents each, by addressing the "Commissioner of Patents, Washington, D. C."